US007093887B2

(12) United States Patent
Mrkovic et al.

(10) Patent No.: US 7,093,887 B2
(45) Date of Patent: Aug. 22, 2006

(54) DRIVE ASSEMBLY FOR A POWER CLOSURE PANEL

(75) Inventors: Dragan Mrkovic, Newmarket (CA); Peter Lance Oxley, Mount Albert (CA); Peter Lejbjuk, Toronto (CA); Jason David Niskanen, Scarborough (CA)

(73) Assignee: Intier Automotive Closures Inc., Newmarket (CA)

( * ) Notice: Subject to any disclaimer, the term of this patent is extended or adjusted under 35 U.S.C. 154(b) by 77 days.

(21) Appl. No.: 10/497,325

(22) PCT Filed: Nov. 29, 2002

(86) PCT No.: PCT/CA02/01820

§ 371 (c)(1), (2), (4) Date: Oct. 12, 2004

(87) PCT Pub. No.: WO03/046321

PCT Pub. Date: Jun. 5, 2003

(65) Prior Publication Data

US 2005/0039404 A1 Feb. 24, 2005

Related U.S. Application Data

(60) Provisional application No. 60/333,769, filed on Nov. 29, 2001.

(51) Int. Cl.
*B60J 7/00* (2006.01)

(52) U.S. Cl. ...................................... 296/155; 192/48.2

(58) Field of Classification Search ................ 296/155; 192/48.2

See application file for complete search history.

(56) References Cited

U.S. PATENT DOCUMENTS

| | | | | |
|---|---|---|---|---|
| 4,530,185 | A | 7/1985 | Moriya et al. | |
| 4,662,109 | A * | 5/1987 | Yui et al. | 49/214 |
| 4,907,474 | A * | 3/1990 | Bolger | 475/14 |
| 5,004,280 | A * | 4/1991 | Schap | 292/341.16 |
| 5,063,710 | A * | 11/1991 | Schap | 49/280 |
| 5,168,666 | A | 12/1992 | Koura et al. | |
| 5,427,421 | A * | 6/1995 | Hamaguchi | 292/216 |
| 5,536,061 | A | 7/1996 | Moore et al. | |
| 5,938,252 | A * | 8/1999 | Uemura et al. | 292/201 |
| 6,081,088 | A | 6/2000 | Ishihara et al. | |
| 6,092,336 | A * | 7/2000 | Wright et al. | 49/339 |
| 6,125,583 | A * | 10/2000 | Murray et al. | 49/291 |
| 6,174,020 | B1 | 1/2001 | Knettle et al. | |
| 6,231,113 | B1 * | 5/2001 | Armbruster et al. | 296/155 |
| 6,276,743 | B1 | 8/2001 | Jyawook et al. | |
| 6,321,488 | B1 | 11/2001 | Bigoszewski et al. | |

(Continued)

FOREIGN PATENT DOCUMENTS

DE 41 24 869 A1 7/1991

(Continued)

*Primary Examiner*—Kiran B. Patel
(74) *Attorney, Agent, or Firm*—Clark Hill PLC

(57) ABSTRACT

A power drive assembly (110) for controlling movement of a closure panel (102, 105) of a vehicle includes a closure panel (102, 105) that moves relative to the vehicle between open and closed positions, and a latch (108, 115) for cinching the closure panel (102, 105) to the vehicle. The drive assembly (110) includes an actuator (134), a first torque output (136) coupled to effect movement of the closure panel (102, 105), a second torque output (138) coupled to the latch (115), and a clutch assembly (144, 150) coupled between the actuator (134) and the torque outputs (136, 138) for selectively transferring torque between the actuator (134) and the torque outputs (136, 138).

14 Claims, 9 Drawing Sheets

U.S. PATENT DOCUMENTS

| | | | | |
|---|---|---|---|---|
| 6,341,448 | B1 | 1/2002 | Murray et al. | |
| 6,390,516 | B1 * | 5/2002 | Kobayashi | 292/201 |
| 6,435,600 | B1 | 8/2002 | Long et al. | |
| 6,561,569 | B1 * | 5/2003 | Risdon et al. | 296/155 |
| 6,588,829 | B1 * | 7/2003 | Long et al. | 296/155 |
| 6,764,113 | B1 * | 7/2004 | Cetnar | 292/201 |
| 6,863,336 | B1 * | 3/2005 | Yokomori et al. | 296/155 |
| 6,880,866 | B1 * | 4/2005 | Tomaszewski et al. | 292/201 |
| 6,964,449 | B1 * | 11/2005 | Takeda et al. | 296/146.4 |
| 2002/0043818 | A1 | 4/2002 | Fukumoto et al. | |
| 2003/0155201 | A1 * | 8/2003 | Bowen | 192/35 |
| 2005/0110300 | A1 * | 5/2005 | Oxley et al. | 296/155 |

FOREIGN PATENT DOCUMENTS

| | | |
|---|---|---|
| DE | 198 28 393 A1 | 6/1998 |

* cited by examiner

DRIVE ASSEMBLY FOR A POWER CLOSURE PANEL

This application claims the benefit of Provisional Application No. 60/333,769, filed Nov. 29, 2001.

FIELD OF THE INVENTION

The present invention relates to a drive assembly for a power closure panel for a vehicle. In particular, the present invention relates to a vehicle door and power actuator therefor which moves the door a closed position and an open position under electrical power.

BACKGROUND OF THE INVENTION

Most vans, mini-vans and multi-purposed vehicles (MPVs) have at least one side door which moves between a closed position and an open position. The conventional sliding door includes an upper, center and lower support arm which is slidably received in a respective track secured to the vehicle for allowing the door to be moved axially relative to the longitudinal axis of the vehicle. Typically, the upper, center and lower tracks each follow the contour of the door opening to allow the door to move in close proximity to the side of the vehicle when the door is moved between the closed position and the open position, and curve inwards at one end thereof to allow the door to remain flush with the side of the vehicle when the door is latched in the closed position.

Although sliding side doors are widely used on vans and MPVs, the conventional sliding door is difficult to operate. For instance, if the vehicle owner has returned from a shopping trip carrying several packages for storage in the cargo area of the vehicle, the owner must first drop the packages, release the door latch and then manually slide the door into the open position. Also, the upper and lower support arm must typically be located a distance inwards from the leading side edge of the door to impart sufficient rigidity to the door, particularly when the door is fully opened. Consequently, attempts have been made to improve upon the conventional vehicle sliding door.

U.S. Pat. No. 6,125,583 describes one such improvement utilizing an electric powered drive system to drive the door between the closed and opened positions. The components of the drive system occupy the space within the door thereby reducing the space available in the door for other power components that would be required for drop glass, either manual or powered.

Therefore, there remains a need for a sliding side door that allows the interior volume of the door to be more available for other door components enabling drop glass, without significantly increasing the manufacturing costs of the door.

SUMMARY OF THE INVENTION

The disadvantages of the prior art may be overcome by providing a power drive assembly that is minimal is size so that it can be packaged in a manner that enables the closure panel to include drop glass.

According to the present invention there is provided a power drive assembly for controlling movement of the sliding closure panel of a vehicle. The power drive assembly includes a door latch for latching and cinching the closure panel to the vehicle, and an actuator assembly for selectively actuating the door latch and moving the closure panel. The drive assembly includes an actuator, a first torque output coupled to effect opening and closing of the closure panel, a second torque output coupled to the door latch, and a clutch assembly coupled to the actuator and the torque outputs that selectively transfers torque between the actuator and the torque outputs.

In a preferred implementation, the clutch assembly includes at least two electromagnetic clutches, each clutch being coupled between the actuator and a respective torque output. The vehicle includes a tensioned belt secured to the vehicle. The drive assembly engages the belt for moving the closure panel between the closed and opened positions. The other torque output includes a cinch/release pulley, and the door latch includes a ratchet configured for rotational movement between a cinched position and a released position, and a cinch cable coupled to the ratchet and the cinch/release pulley for moving the ratchet into the cinched position. The door latch also includes a pawl configured for locking the ratchet in the cinched position, and a release cable coupled to the pawl and the cinch/release pulley for releasing the ratchet from the cinched position.

BRIEF DESCRIPTION OF THE DRAWINGS

The present invention will now be described, by way of example only, with reference to the accompanying drawings, in which.

DETAILED DESCRIPTION OF THE PREFERRED EMBODIMENT

Figure 1:
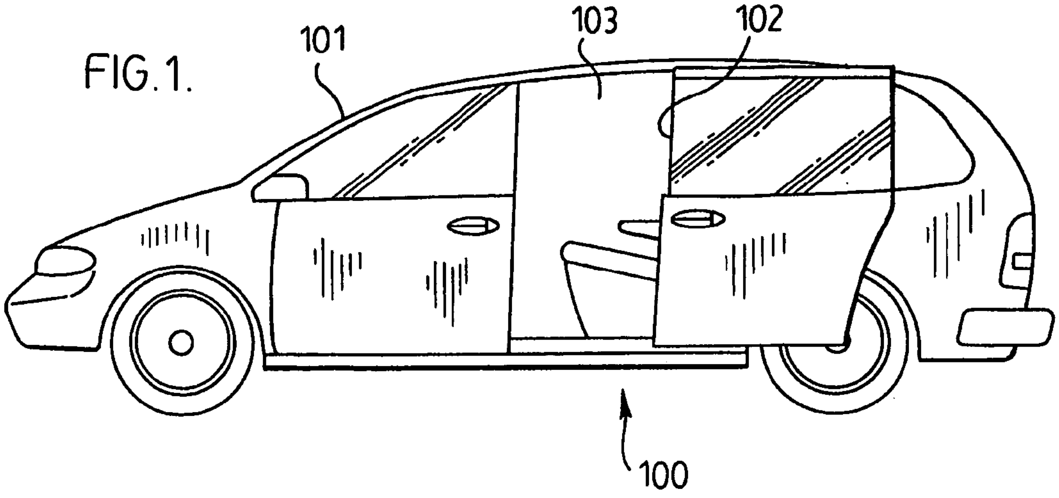
FIG. 1 is a schematic view of a vehicle incorporating the present invention.

Referring to FIG. 1, a power sliding door assembly 100 for a vehicle 101 comprises a closure panel or door 102, a second closure panel in the form of a liftgate 105 and power drive assemblies for controlling the operation of the door 102 and liftgate 105. The vehicle has a door opening 103 allows access to an internal passenger/cargo region of the vehicle, and has a shape corresponding to that of the door 102. The vehicle also includes three door tracks (not shown), an upper track located above the door opening, a center track aft of the door opening 103 and a lower located below the door opening. A door striker 104 (see FIGS. 3 and 4) is located at one side of the door opening and secured to a door pillar of the vehicle.

The door 102, as is common in the art, includes an upper support arm (not shown) disposed adjacent the upper edge of the door 102, a center support arm (not shown) adjacent the rear edge of the door 102, and a lower support arm 105' disposed adjacent the lower edge of the door 102. The upper support arm extends inwardly towards the passenger/cargo region, and is slidably received in the upper door track. The center support arm slidably engages the center track. Similarly, the lower support arm 105' extends inwardly towards the passenger/cargo region, and is slidably received in the lower door track 107. Together, the door tracks and the support arms allow the door 102 to slide between a closed position in which the door 102 seals the door opening, and an opened position in which the door 102 exposes the door opening to thereby allow access to the passenger/cargo region.

The liftgate 105, as is also common in the art, includes a pair of gas struts 109, pivotally attached to the liftgate 105 at 111 and to the vehicle at 113. The upper edge of the liftgate 105 is hingedly attached to the vehicle. The liftgate 105 has a latch 115 located to operatively engage a striker (not illustrated) on the vehicle to selectively close the liftgate 105 and engage and seal with the vehicle.

Figure 2:
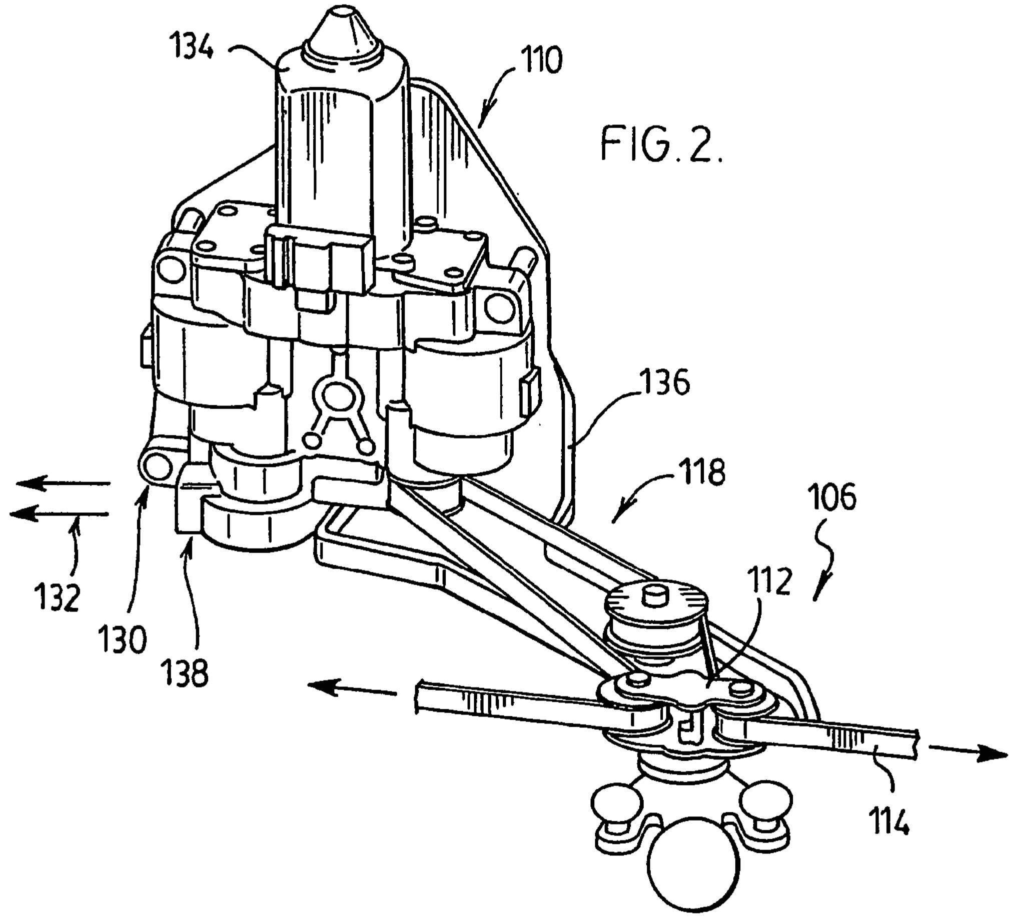
FIG. 2 is an illustration of the drive assembly of the present invention.

Referring to FIG. 2, power drive assembly includes an actuator assembly 110 for driving the door 102 relative to the vehicle and a drive assembly 106 operably connected between the door 102 and the vehicle 101. Preferably, the door drive assembly 106 is secured to the door 102 adjacent the lower edge of the door 102 to free up space in the interior of the door 102 for electrical components, such as power window regulators, and other moving glass components, such as glass and glass run channels.

Figure 8:
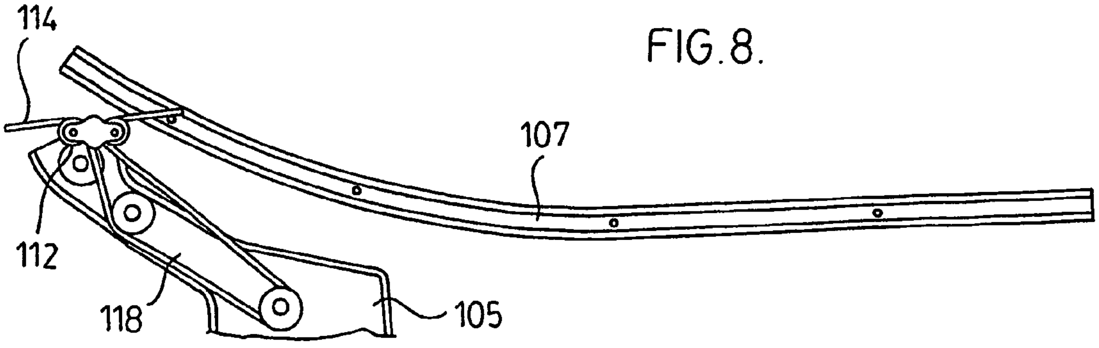
FIG. 8 is a top plan view of the driving connection between the power sliding door and the vehicle.

As shown in FIGS. 2 and 8, the door drive assembly 106 includes a guide assembly 112 secured to the door 102, and a flexible toothed elastomeric belt 114. The guide assembly 112 comprises a bracket having a pair of belt guides or pulleys through which the toothed belt 114 can pass. One end of the toothed belt 114 is secured to the vehicle 101 proximate the bottom front edge of the door opening, and the opposite end of the belt 114 is secured to the vehicle proximate the bottom rear edge of the door opening 103. Preferably, the belt 114 has teeth (not shown) disposed on one surface thereof. The belt 114 is trained through the guide assembly 112, extending from the bottom front edge of the door opening, in one direction through one of the belt guides, returning in the opposite direction through the other belt guide, thereby forming a belt loop portion 118 therebetween, and terminating at the bottom rear edge of the door opening. As will be discussed below, the actuator assembly 110 engages the belt loop 118, to thereby drive the door 102 between the closed and opened positions.

The door latch 108 is secured to the door 102 adjacent the edge of the door 102 which is closest to the door striker 104 when the door 102 is in the closed position. Door latch 108 has power operated cinching and releasing functions. A typical cinching latch 108 is described in U.S. Pat. No. 6,125,583.

Figure 3:
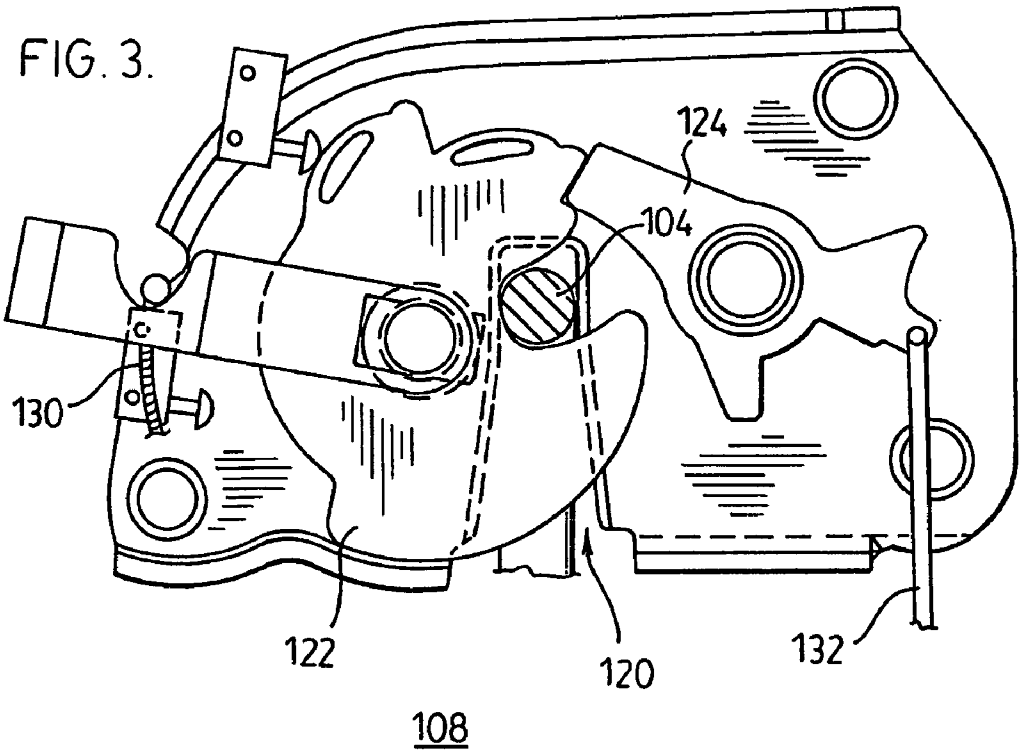
FIGS. 3 and 4 are schematic views depicting a typical cinching and releasing power latch in the cinched position and in the released position, respectively.
Figure 4:
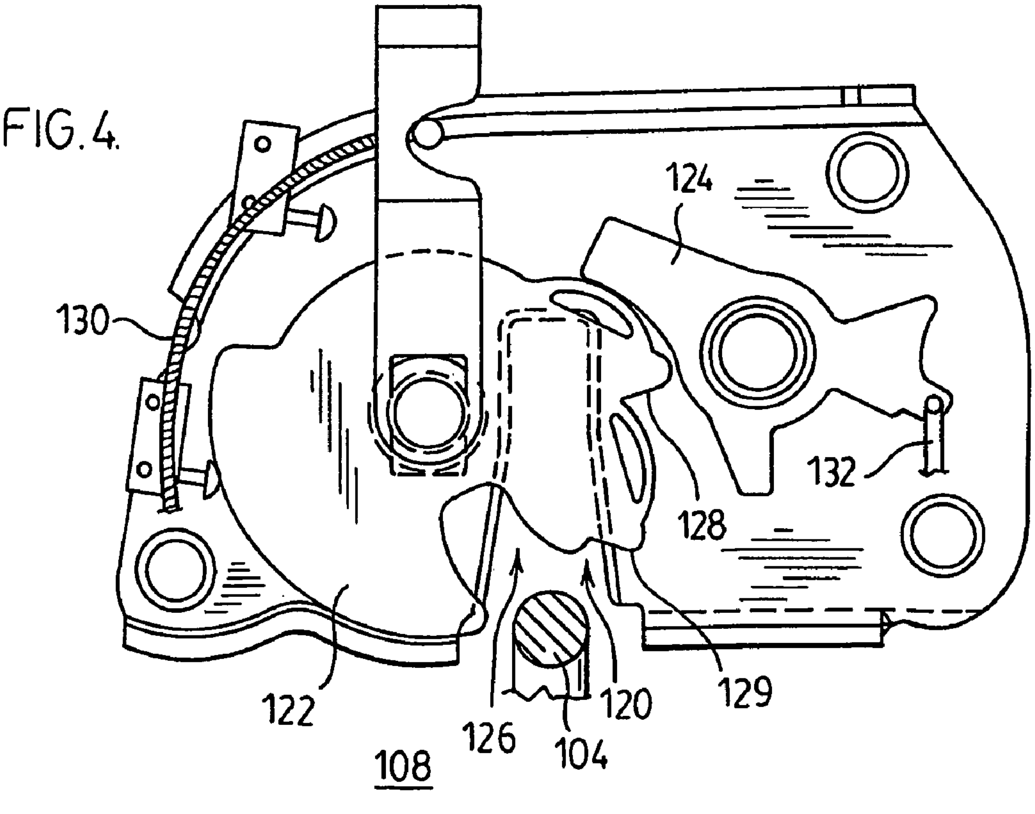

As shown in FIGS. 3 and 4, the door latch 108 includes a slot 120 for receiving the door striker 104 therein, a ratchet 122 for cinching the door striker 104 within the slot 120, and a pawl 124 for selectively locking the ratchet 122. The ratchet 122 includes a U-shaped mouth 126, a secondary detent portion 128, and a primary detent portion 129 (see FIG. 4) formed in a circumferential portion of the ratchet 122. The ratchet 122 is rotatable between a primary latched position in which the door striker 104 is firmly engaged between the slot 120 and the U-shaped mouth 126 (see FIG. 3), a secondary latched position in which the door striker 104 is partially secured, and a released position in which the door striker 104 is released from the U-shaped mouth 126 (see FIG. 4). The ratchet 122 also includes a spring (not shown) which urges the mouth 126 towards the released position.

The pawl 124 is rotatable about its own axis, and includes a spring that urges the pawl 124 to rotate into engagement with the circumference of the ratchet 122. Consequently, the ratchet 122 is rotated into a secondary latched position and pawl 124 engages detent portion 129. The ratchet 122 is further rotated into the primary latched position, wherein the pawl 124 engages the detent portion 128, thereby latching the ratchet 122.

In addition to the ratchet 122 and the pawl 124, the door latch 108 includes a flexible first cable 130 coupled at one end to the ratchet 122, and a flexible second cable 132 connected at one end to the pawl 124. As will be discussed below, the opposite ends of the cables 130, 132 are connected to the actuator assembly 110. Consequently, when the actuator assembly 110 applies tension to the first cable 130, the ratchet 122 rotates into the cinched position. When the actuator assembly 110 applies tension to the second cable 132, the pawl 124 is released from the detent portion 128 of the ratchet 122, thereby allowing the ratchet 122 to rotate back into the released position. It is apparent to those skilled in the art that cables 130, 132 could replaced by levers or rods as is common in the art.

Figure 5:
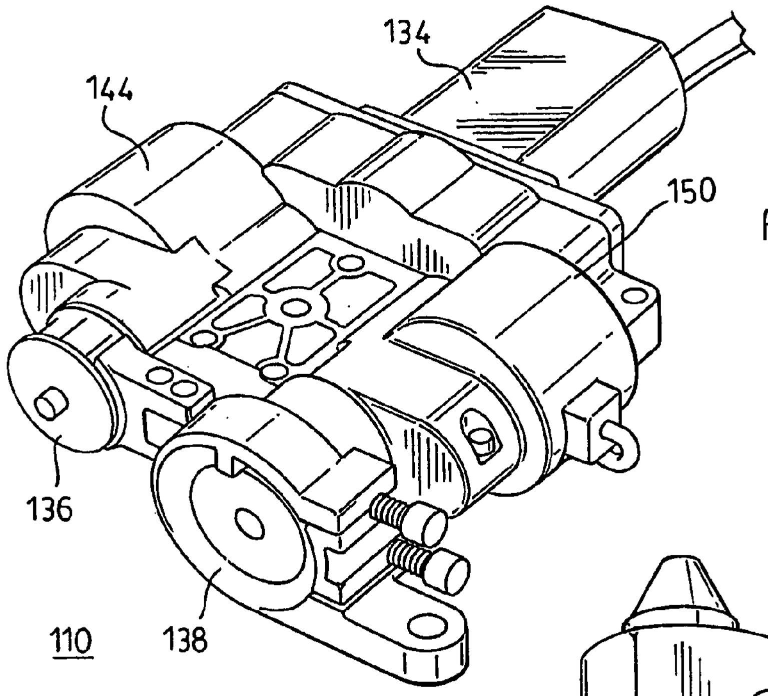
FIG. 5 is a top plan view of the actuator assembly.
Figure 6:
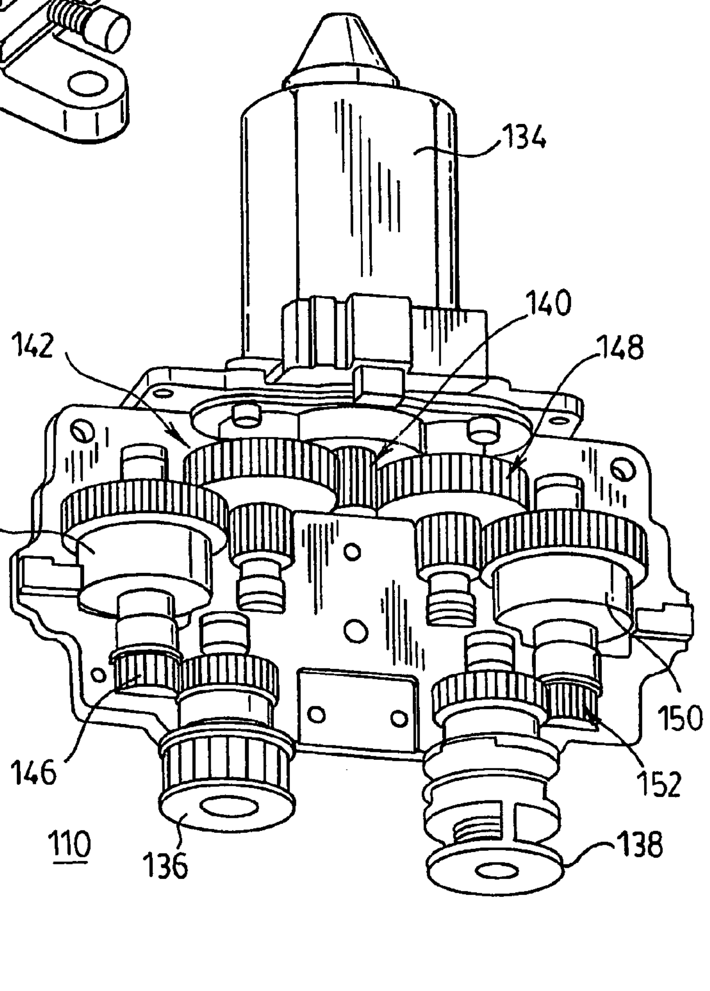
FIG. 6 is top plan view of the actuator assembly exposing the gear reduction sets and the electromagnetic clutches therein.

Referring to FIGS. 5 and 6, the actuator or drive assembly 110 includes an actuator 134, a first torque output 136, a second torque output 138, and a clutch assembly for controlling operation of the torque outputs 136, 138. The components of the drive assembly 110 are mounted within a housing 139. Preferably the housing is a two part construction that rotatably mounts various components and envelopes the gear sets.

Figure 9:
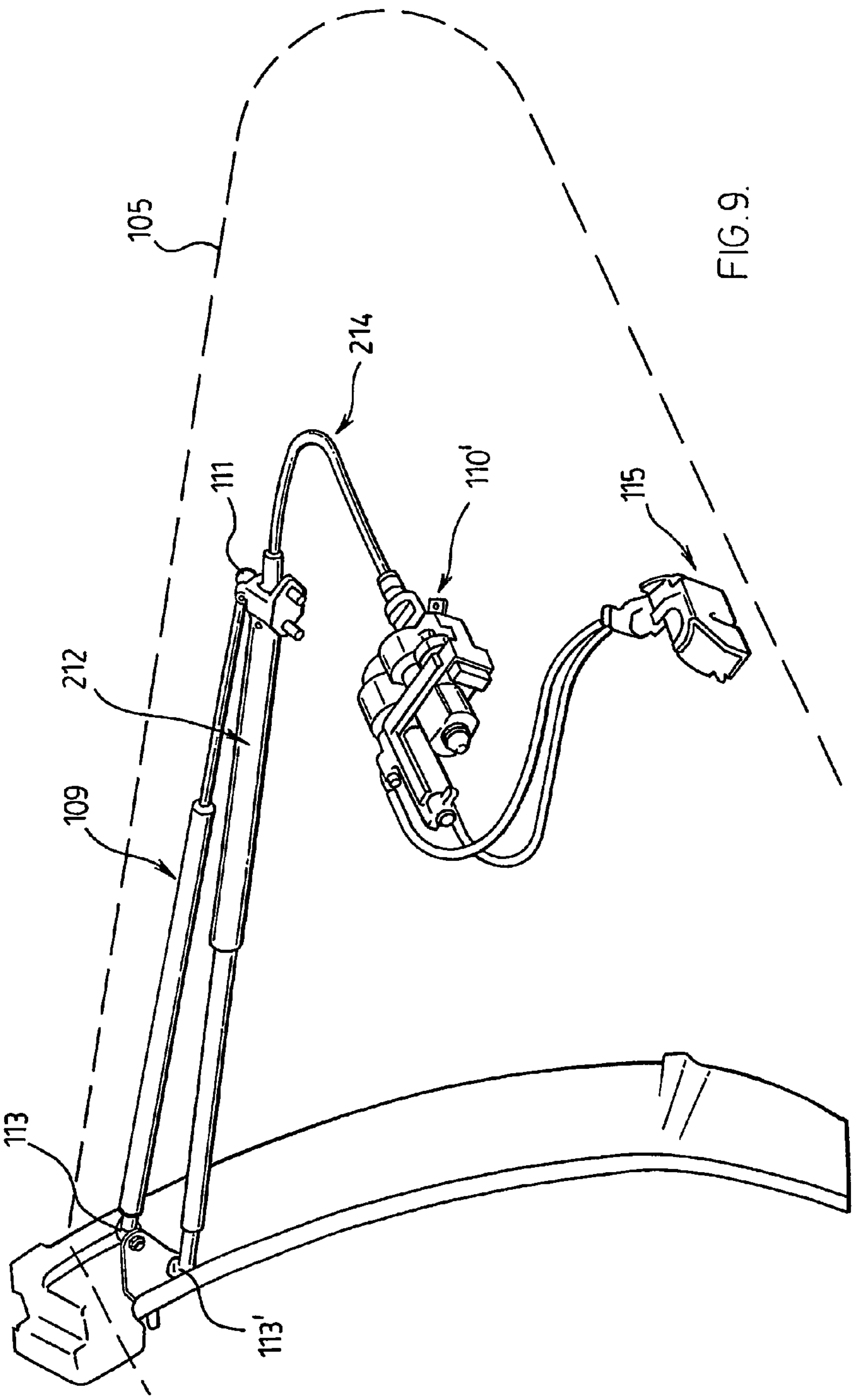
FIG. 9 is partial perspective view of a liftgate according to the present invention.

The first torque output 136 is mounted in adjacent the second torque output 138 with the respective axis of rotation extending parallel to each other. The actuator 134 mounts onto an end of the housing 139. The axis of rotation of actuator 134 extends parallel to the axi of rotation of the torque outputs 136, 138. In order to minimize packaging size, the housing has a relatively low profile, i.e., width is greater than depth. In the embodiment of FIGS. 5 and 6, both of the torque outputs extend from the housing 139 at an end opposite the actuator 134. However, as shown in FIG. 9, one of the torque outputs may extend from the housing on the same side as the actuator.

Preferably, the actuator 134 comprises a DC electric motor having an output drive pinion 140, and being powered by the vehicle s electrical system. However, other forms of actuators, such as hydraulically-actuated systems, may also be employed. Also, preferably the actuator includes a first input or primary reduction gear set 142 driven by the output pinion 140, a first electromagnetic clutch 144 having a splined casing driven by the output of the first input reduction gear set 142, and a first output reduction gear set 146 (including the clutch output pinion of the first electromagnetic clutch 144) driving the first torque output 136. Similarly, preferably the actuator also includes a second input or primary reduction gear set 148 driven by the output pinion 140, a second electromagnetic clutch 150 having a splined casing driven by the output of the second primary reduction gear set 148, and a second secondary or output reduction gear set 152 (including the clutch output pinion of the second electromagnetic clutch 150) driving the second torque output 138. The preferred electromagnetic clutches are more particularly described in co-pending International patent application no. WO 02/50445.

Preferably, the actuator 134, the first electromagnetic clutch 144 and the second electromagnetic clutch 150 are connected, via suitable electrical cabling, to the vehicle s electrical accessory control system. As will be apparent, if the clutches 144, 150 are not actuated, the clutch output pinion of each clutch 144, 150 will be allowed to freewheel relative to the splined casing of the respective clutch 144, 150. On the other hand, if either of the clutches 144, 150 is actuated, rotational movement of the respective splined casing (via the output pinion 140 of the actuator 134) will cause rotational movement of the respective clutch output pinion. In this manner, the actuator is able to selectively transfer torque between the actuator 134 and the torque outputs 136, 138.

As shown, the first torque output 136 comprises a pinion having a number of teeth extending outwards from the body of the pinion. As was discussed above, the door drive assembly 106 includes a flexible belt 114 which forms a belt loop 118 via the guide 112. The belt loop 118 is trained around the pinion 136, with the pinion teeth meshing with the belt teeth. Consequently, when the pinion 136 rotates in one direction, the actuator assembly 110 drives the door 102 from the closed position to the opened position, and when the pinion 136 rotates in the opposite direction, the actuator assembly 110 drives the door 102 from the opened position to the closed position. From the foregoing, it will be apparent that the disclosed configuration of the first torque output 136 is not essential, and that other forms thereof may be used, including a pulley with or without teeth.

Preferably, the second torque output 138 comprises a pulley which includes a circumferential channel bound by a pair of parallel opposing side walls. As was discussed above, the door latch 108 includes a flexible first cable 130 connected at one end to the ratchet 122 for moving the ratchet 122 into the cinched position, and a flexible second cable 132 connected at one end to the pawl 124 for releasing the ratchet 122 from the cinched position. The cables 130, 132 are wound in opposite directions around the pulley 138, with the opposite ends of the cables 130, 132 being fixedly connected to the pulley 138. Consequently, when the pulley 138 rotates in one direction, tension is applied to the first cable 130, thereby forcing the ratchet 122 to rotate from the released position into the cinched position. When the pulley 138 rotates in the opposite direction, tension is released from the first cable 130 and applied to the second cable 132, thereby causing the pawl 124 to be released from the detent portion 128 of the ratchet 122, and allowing the ratchet 122 to rotate back into the released position. Optionally, the second cable 132 is also operably connected to a hold open latch or catch 99 that holds the sliding door 102 in the open condition. Releasing movement of the second cable 132 will effect release of either the door latch or the hold open latch 99. From the foregoing, it will also be apparent that the disclosed configuration of the second torque output 138 is not essential, and that other forms thereof may be used.

As was discussed above, preferably the actuator assembly 110 is secured to the door 102 adjacent the lower edge of the door 102. This positioning is possible since the incorporation of a door drive assembly controller (comprising the first primary reduction gear set 142, the first electromagnetic clutch 144, and the first secondary reduction gear set 146) and a latch controller (comprising the second primary reduction gear set 148, the second electromagnetic clutch 150, and the second secondary reduction gear set 152) in a single package, driven by a single actuator 134, allows the actuator assembly 110 to be made sufficiently small so as to fit into this confined location.

The operation of the power drive assembly will now be described. Initially, if the sliding door is latched, the door 102 will be in the closed position, and the ratchet 122 of the door latch 108 will have rotated into the cinched position thereby cinching the door striker 104 within the slot 120 and the U-shaped mouth 126 of the ratchet 122. If the vehicle owner wishes to have the door opened automatically, the vehicle owner issues an open command to the vehicle s accessory control system, either via a pushbutton switch located within the vehicle or via a wireless communications device such as a key fob.

Upon receipt of the open command, the vehicle s accessory control system activates the second electromagnetic clutch 150, and then initiates rotation of the actuator 134 in a direction which causes the pulley 138 to increase the tension in the second cable 132. As a result, the pawl 124 becomes released from the detent portion 128 of the ratchet 122, thereby causing the ratchet 122 to rotate back into the released position, and the door striker 104 to be released from the ratchet 122. The vehicle's accessory control system deactivates the second electromagnetic clutch 150, allowing the pawl 124 to rotate back into engagement with the circumferential portion of the ratchet 122. The vehicle's accessory control system then activates the first electromagnetic clutch 144, thereby initiating rotation of the pinion 136 in a direction which drives the door 102 from the closed position to the opened position. When the door 102 reaches the opened position, the accessory control system deactivates the first electromagnetic clutch 144 and the actuator 134.

If the vehicle owner then wishes to have the door closed automatically, the vehicle owner issues a "close" command to the vehicle's accessory control system, either via a pushbutton switch located within the vehicle or via a wireless communications device. Upon receipt of the "close" command, the vehicle s accessory control system activates the first electromagnetic clutch 144, and then initiates rotation of the actuator 134 causing the pinion 136 to rotate in a direction which drives the door 102 from the opened position towards the closed position. In certain vehicles, the vehicle incorporates a hold open latch that holds the sliding door 102 in the open condition. Upon receipt of the "close" command, the vehicle's accessory control system activates the second electromagnetic clutch 150, to release the hold open latch 99, prior to actuating the first electromagnetic clutch 144. The door 102 reaches the position where the door striker 104 is received within the slot 120 and the U-shaped mouth 126 of the ratchet 122. Further, pawl 124 will engage secondary detent 128, holding the ratchet in the secondary position. The accessory control system deactivates the first electromagnetic clutch 144, thereby preventing further movement of the door 102 via the door drive assembly 106. The accessory control system then activates the second electromagnetic clutch 150, thereby initiating rotation of the pulley 138 in a direction which increases the tension in the first cable 130, forcing the ratchet 122 to rotate from the released position towards the cinched position. When the ratchet 122 reaches the primary latched position, the pawl

124 will be in engagement with the primary detent portion 129 of the ratchet 122. The door 102 is in sealing engagement with the vehicle 101, closing the opening 103. Consequently, at this point, the vehicle's accessory control system deactivates the second electromagnetic clutch 150, releasing the tension in the first cable 130.

Figure 7:
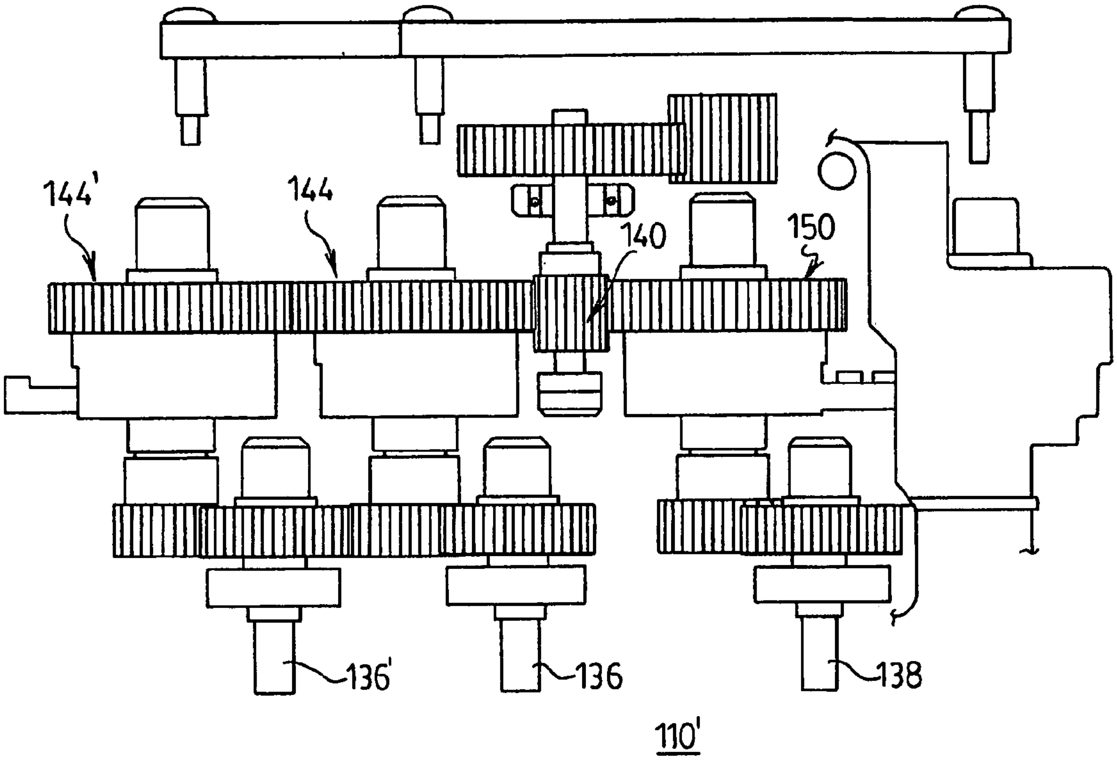
FIG. 7 is an illustration of one variation of the actuator assembly shown in FIG. 6.

Variations of the described embodiment are envisaged. For instance, the actuator assembly 110 is not limited to having only two clutches 144, 150. Rather, as shown in FIG. 7, the actuator assembly 110' may have any number of clutches (144, 144', 150 in FIG. 7) coupled to the actuator 134. This latter variation is advantageous since it would allow the actuator to control multiple devices using only a single actuator. For instance, the actuator could be used to slide and cinch/release the door as described above, and also to cause the window glass of the door to extend or retract.

Referring now to FIG. 9, a second embodiment of the drive assembly 110' of the present invention is illustrated in driving engagement with a power strut mechanism 212. As explained in detail further, the drive assembly 110' drives the power strut mechanism 212 to extend and retract to effect powered opening and closing of the liftgate 105 and is operatively connected to a latch 115 to effect the latch 115 to cinch and release.

Drive assembly 110' is preferably mounted within the liftgate 105 or optionally in vehicle. One of the torque outputs is operatively attached via cables to the cinching latch 115 and via a flex drive 214 to the power strut mechanism 212. The latch 115 is mounted in the liftgate 105 in a conventional manner and positioned to engage a striker to retain the liftgate in the closed condition. The power strut mechanism 212 is pivotally mounted to the "D" pillar of the vehicle at 113', which is slightly offset from the attachment and pivot point 113 of the gas strut 109. The power strut mechanism 212 is preferably mounted to the liftgate at the same attachment point 111 of the gas strut 109.

Figure 10:
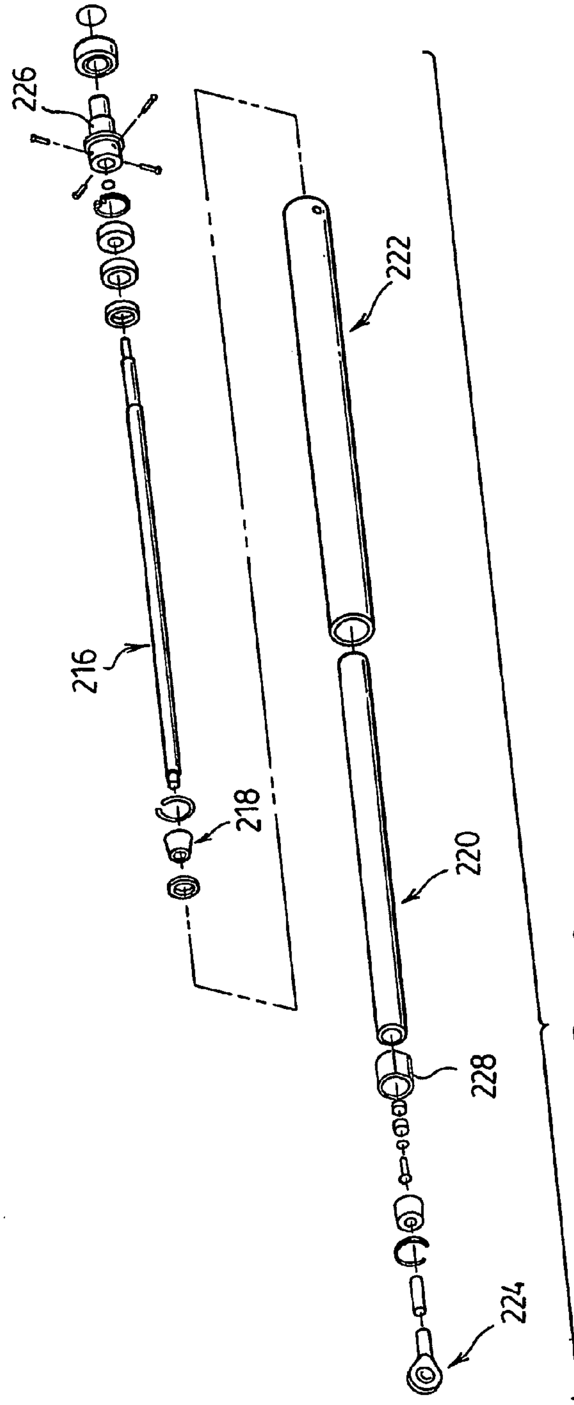
FIG. 10 is an exploded view of a power strut mechanism that is utilized in combination with the drive assembly of the present invention.
Figure 11:
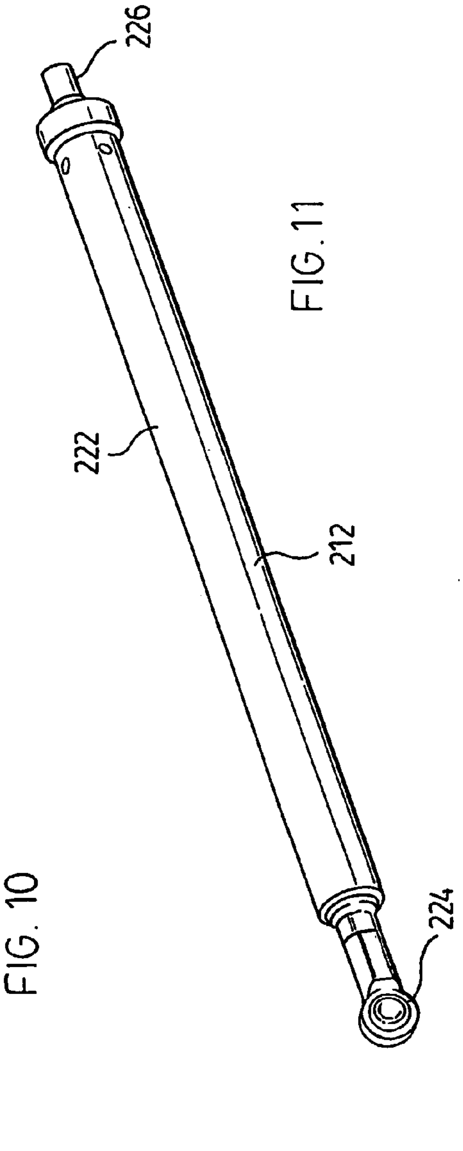
FIG. 11 is a perspective view of the power strut mechanism of FIG. 10.

Referring to FIGS. 10 and 11, the power strut mechanism 212 is illustrated in detail. The strut mechanism 212 generally comprises a worm screw 216, a nut 218, a shaft 220, a tubular housing 222 and a rod end attachment 224. The worm screw 216 is journal mounted within the housing 222. A first end has a fixed fitting 226 that receives a rotating drive via flex drive 214. Nut 218 threadingly engages the worm screw 216 so that relative rotation of the nut 218 effects travel of the nut 218 along the worm screw 216. Shaft 220 is hollow such that screw 216 can extend therethrough. An end of the shaft 220 engages the nut 218. Rod end attachment 224 extends from shaft 220. Collar 228 is mounted on the end of housing 222 and slidingly supports shaft 220.

Nut 218 is restrained from rotating by housing 222 Driving rotation of the screw 216 causes the nut 218 to travel along the screw 216, effecting extension and retraction of the rod end attachment 224 relative to the housing 222. Nut 218 preferably has a multiple start thread with a high helix angle enabling the nut 218 to be back driven during manual operation of the liftgate 105.

Extension of the strut mechanism 212 urges the liftgate 105 to move from a closed position to the open position. The strut mechanism 212 needs only to move the liftgate 105 until the conventional gas struts 109 take effect to move the liftgate to the fully open position. Conversely, the strut mechanism 212 retracts until the gas struts 109 are overcome by the weight of the liftgate which moves the liftgate to the closed position. The strut mechanism 212 continues to control speed of movement of the liftgate 105.

Figure 12:
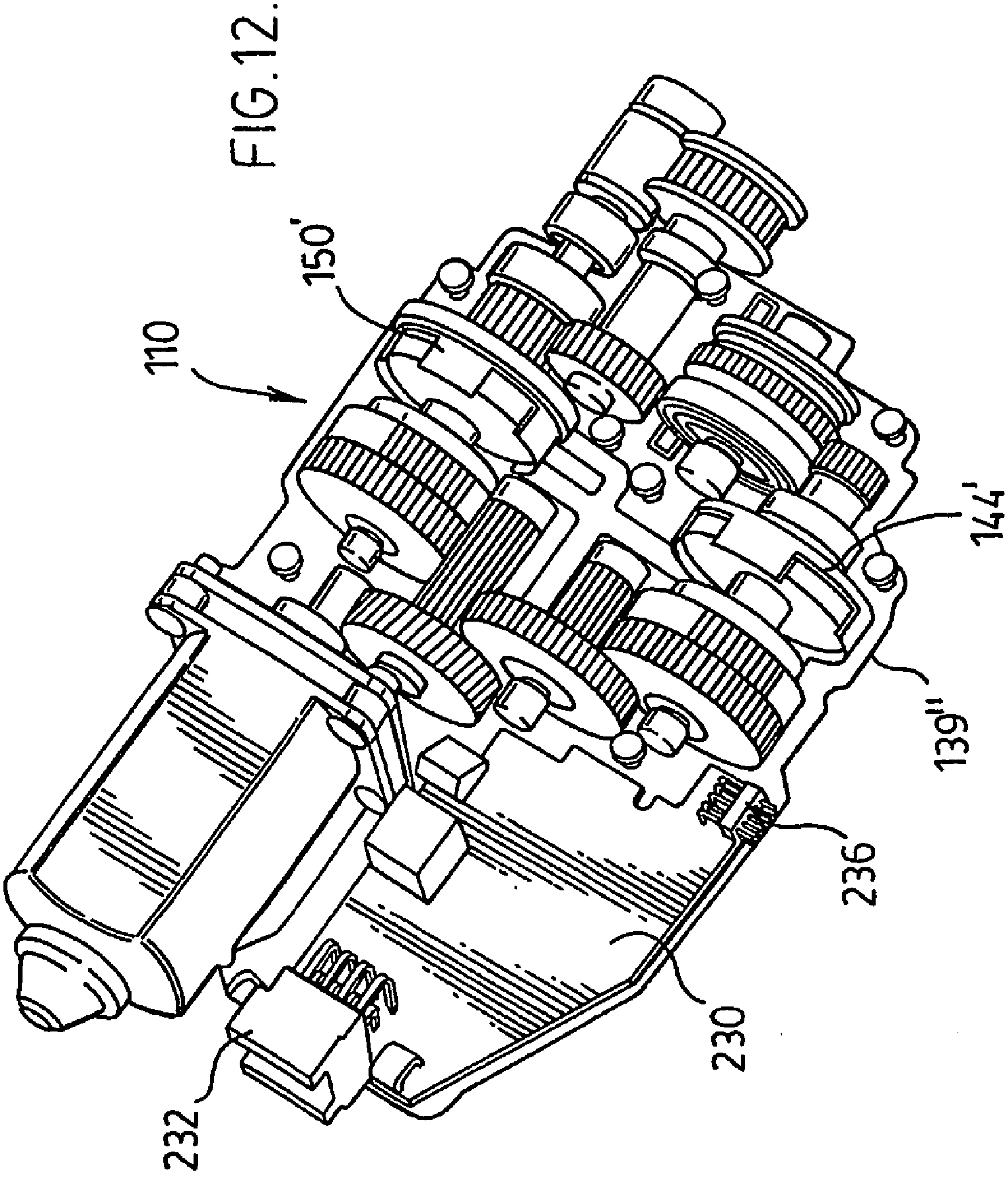
FIG. 12 is perspective view of a second embodiment of the present invention.
Figure 13:
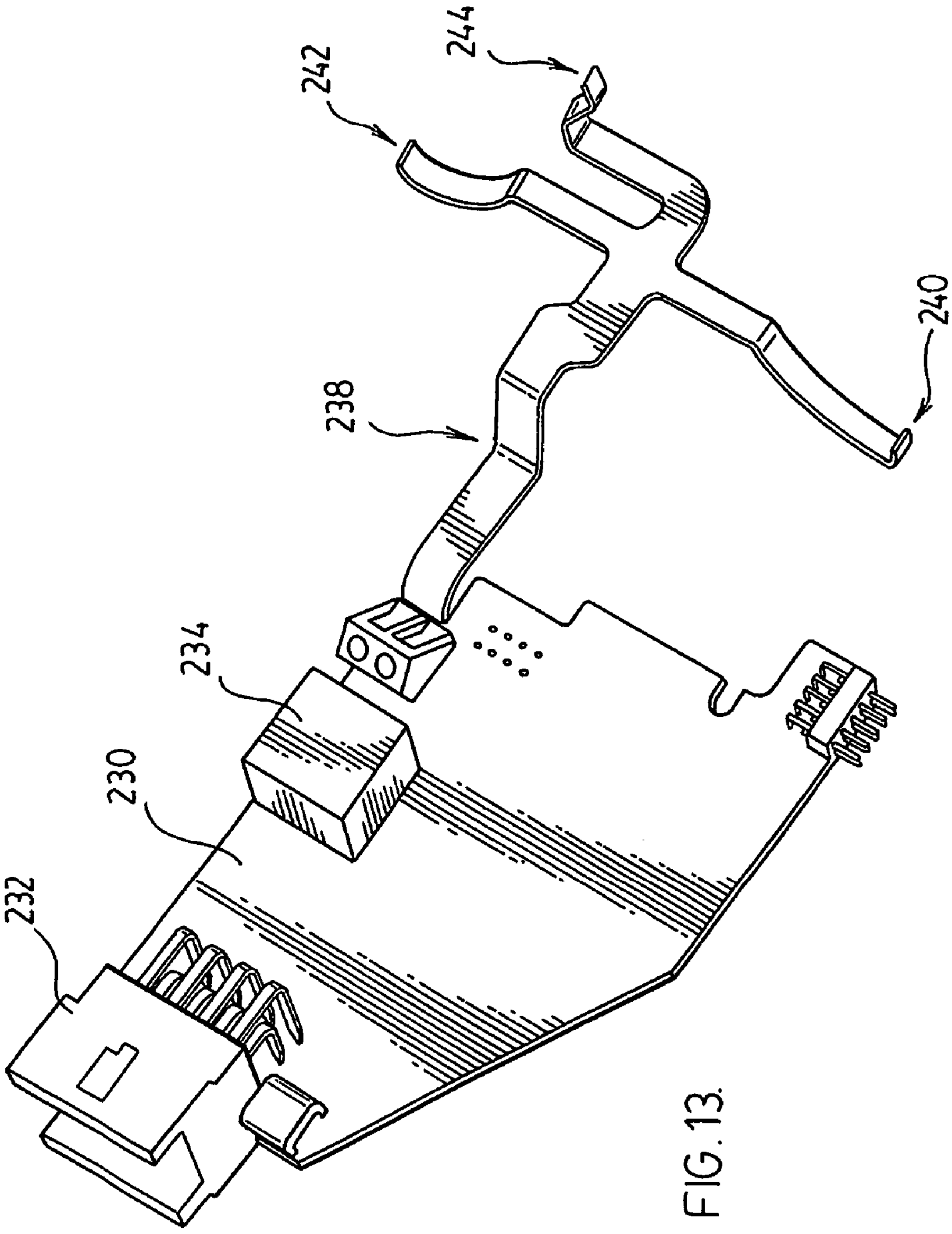
FIG. 13 is perspective view of a second circuit board of the drive assembly of FIG. 12.

Referring to FIGS. 12 and 13, a further embodiment of the drive assembly of the present invention is illustrated. The drive assembly 110" has a housing 139" that has an integral region for housing the controller circuit board 230. The circuit board 230 has a female connector 232 for receiving electrical power and external signals of operation. The connector 232 electrically connects to an electronic control unit (ECU) 234. A flexible foil 238 extends from the circuit board 230 for electrical connection between the ECU 234 and each of the electromagnetic clutches 144' and 150'. End 240 connects to clutch 144' and end 242 connects to clutch 150'. Foil 238 has a Hall effect sensor 244 and positioned to sense rotation of one of the torque outputs.

Figure 15:
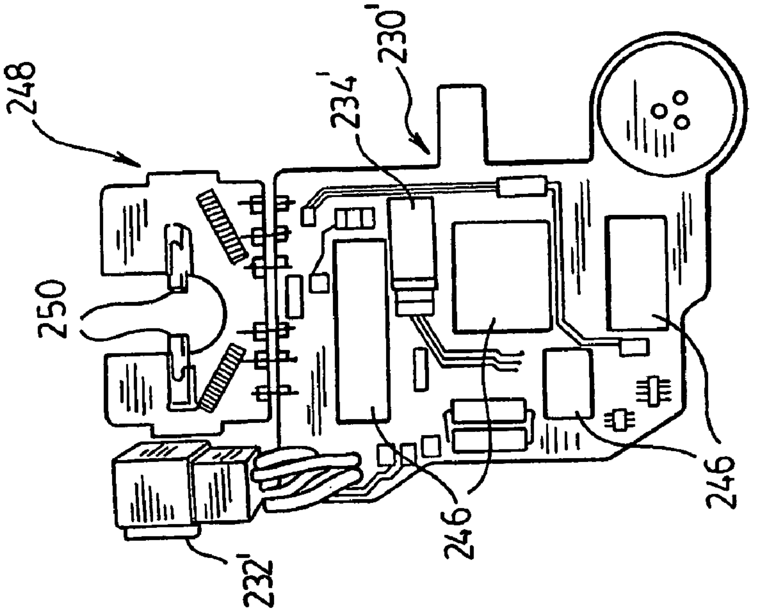
FIG. 15 is a plan view of a circuit board of the drive assembly of FIG. 14.
Figure 14:
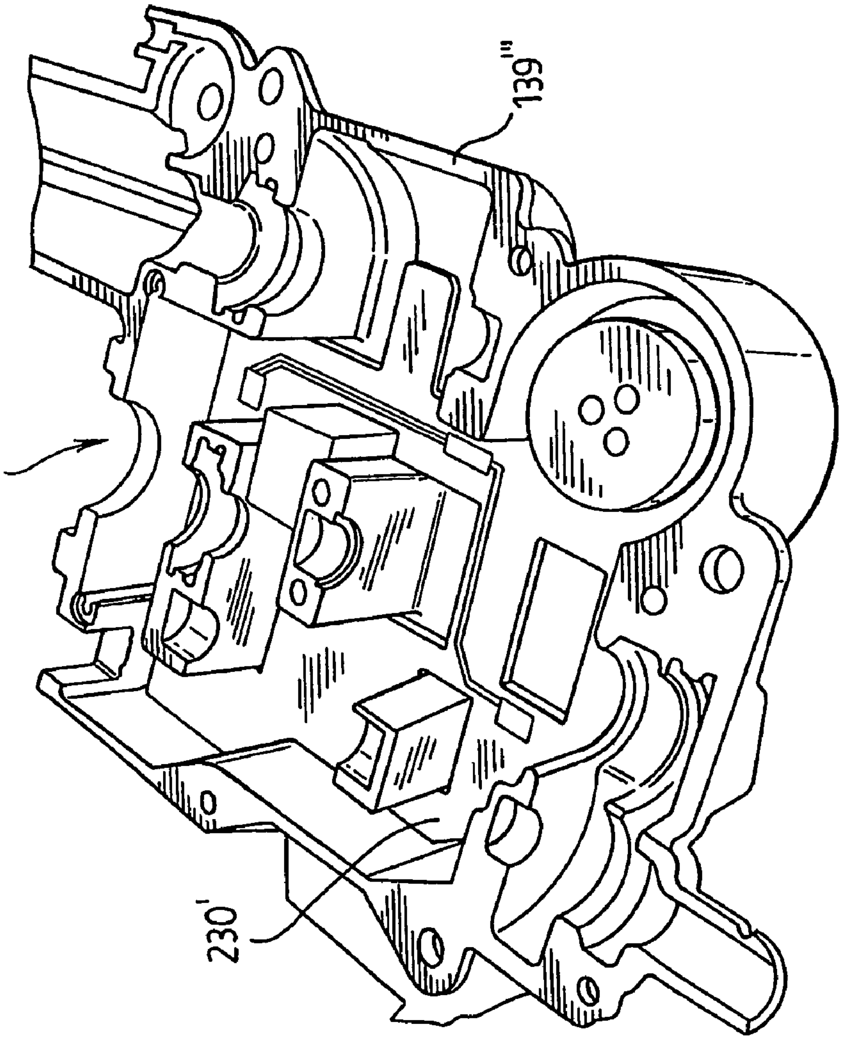
FIG. 14 is a perspective view of half of the housing of another embodiment of a drive assembly of the present invention.

Referring to FIGS. 14 and 15, a further embodiment of the drive assembly of the present invention is illustrated. Drive assembly 110'" has a housing 139'" that is configured to nestingly receive a printed circuit board 230'. Circuit board 230' has a plurality of apertures 246 that engage support posts in the housing 139'". The circuit board 230' has a female connector 232' and a brush card 248. Brush card 248 has a plurality of sensors 250 mounted thereon providing signals to the ECU 234'.

It is now apparent to those skilled in the art that the advantage of the drive assembly of the present invention is that the same drive assembly can be utilized to power a sliding door and also power a liftgate. This feature reduces the number of parts required to provide such features on the vehicle thereby providing cost savings. Only the programming of the ECU needs to be modified for each application.

The present invention is defined by the claims appended hereto, with the foregoing description being illustrative of a preferred embodiment of the present invention. Those of ordinary skill may envisage certain additions, deletions and/or modifications to the described embodiment, which although not explicitly described herein, do not depart from the scope of the invention, as defined by the appended claims.

What is claimed is:

1. A drive assembly comprising:
- an actuator;
- at least two torque outputs;
- a clutch assembly comprising at least two electromagnetic clutches, each of said electromagnetic clutches coupled between the actuator and a respective one of the torque outputs for selectively transferring torque between the actuator and one of the torque outputs;
- an input gear set operatively coupling the actuator to the clutch assembly and an output gear set operatively coupling the clutch assembly to the torque outputs; and
- a housing rotatably mounting and enveloping said input and output gear sets.

2. The drive assembly according to claim 1, wherein said housing mounts said at least two electromagnetic clutches in a side by side relation presenting a relatively low profile.

3. The drive assembly according to claim 2, wherein said actuator is mounted to an end of said housing and the prime move has an axis of rotation extending substantially parallel to an axis of rotation of each of said torque outputs.

4. The drive assembly according to claim 3, wherein said electromagnetic clutches are in a disengaged state until energized.

5. The drive assembly according to claim 1, wherein said drive assembly further comprises an electronic control unit operatively connected with said electromagnetic clutches and said actuator.

6. The drive assembly according to claim 5 wherein said electronic control unit is mounted within said housing.

7. The drive assembly according to claim 6, further including:

a closure panel mounted on a vehicle and movable between open and closed positions;

a latch operable for cinching and latching the closure panel into sealing engagement with the vehicle when said closure panel is in said closed position;

said first torque output coupled between the closure panel and vehicle to effect said opening and closing movement and said second torque output coupled to the latch selectively actuating the cinching and releasing of said latch.

8. The combination according to claim 7, wherein the latch comprises:

a ratchet configured for rotational movement between a latched position and a released portion, and a cinch cable coupled between the second torque output and the ratchet for effecting movement of the ratchet into the latched position; and a pawl configured for holding the ratchet in the latched position, and a release cable coupled between the second torque output and the pawl for effecting disengagement of the pawl from the ratchet enabling movement of the ratchet to the unlatched position, wherein driving rotation of the second torque output in a first sense effects movement of the ratchet into the latched position and driving rotation of the second torque output in a second opposite sense effects disengagement of the paw.

9. A combination according to claim 8, wherein the vehicle includes:

at least one guide track for allowing the closure panel to slide between the open and closed positions, and at least one support arm extending from said closure panel, said t least one support arm in sliding engagement with the guide track.

10. The combination according to claim 9, wherein the vehicle has a tensioned belt and said first torque output engages said tensioned belt, whereby driving rotation of said first torque output drives along said tensioned belt effecting movement of said closure panel between said open and closed positions.

11. The combination according to claim 7, further comprising a hold open latch mounted between the vehicle and the closure panel selectively retaining the closure panel in the open condition, said hold open latch operably connected to said second torque output and selectively actuated for releasing said closure panel, enabling travel thereof.

12. The combination according to claim 8, wherein the closure panel is hingedly mounted to the vehicle and a power strut mechanism pivotally extends the closure panel and the vehicle, said power strut mechanism having a rotatable screw and nut whereby rotation of said screw relative to the nut extends and retracts said strut to effect opening and closing movement of said closure panel.

13. The combination according to claim 12, further comprising at least one gas strut pivotally extending between the closure panel and the vehicle and said power strut mechanism.

14. The combination according to claim 13, wherein said power strut mechanism mounts to the vehicle at a pivot point offset from where said at least one gas strut pivotally connects to said vehicle.

* * * * *